US010549792B2

(12) United States Patent
Belpaire

(10) Patent No.: US 10,549,792 B2
(45) Date of Patent: Feb. 4, 2020

(54) LIGHTWEIGHT BAFFLE OR REINFORCEMENT ELEMENT AND METHOD FOR PRODUCING SUCH A LIGHTWEIGHT BAFFLE OR REINFORCEMENT ELEMENT

(71) Applicant: SIKA TECHNOLOGY AG, Baar (CH)

(72) Inventor: Vincent Belpaire, Uccle (BE)

(73) Assignee: SIKA TECHNOLOGY AG, Baar (CH)

(*) Notice: Subject to any disclaimer, the term of this patent is extended or adjusted under 35 U.S.C. 154(b) by 288 days.

(21) Appl. No.: 15/101,284

(22) PCT Filed: Dec. 12, 2014

(86) PCT No.: PCT/EP2014/077529
§ 371 (c)(1),
(2) Date: Jun. 2, 2016

(87) PCT Pub. No.: WO2015/086806
PCT Pub. Date: Jun. 18, 2015

(65) Prior Publication Data
US 2016/0304133 A1  Oct. 20, 2016

(30) Foreign Application Priority Data
Dec. 13, 2013 (EP) .................................. 13197147

(51) Int. Cl.
*B62D 29/00* (2006.01)
*B29C 44/02* (2006.01)
(Continued)

(52) U.S. Cl.
CPC .......... *B62D 29/002* (2013.01); *B29C 44/027* (2013.01); *B29C 44/348* (2013.01);
(Continued)

(58) Field of Classification Search
None
See application file for complete search history.

(56) References Cited

U.S. PATENT DOCUMENTS

| 5,266,133 A | 11/1993 | Hanley et al. |
| 5,373,027 A | 12/1994 | Hanley et al. |

(Continued)

FOREIGN PATENT DOCUMENTS

| CN | 103347475 A | 10/2013 |
| EP | 0204970 B1 | 12/1990 |

(Continued)

OTHER PUBLICATIONS

Dec. 18, 2017 Office Action issued in Chinese Patent Application No. 201480067909.7.
(Continued)

*Primary Examiner* — Chinessa T. Golden
(74) *Attorney, Agent, or Firm* — Oliff PLC

(57) ABSTRACT

A baffle or reinforcement element for sealing and/or reinforcing a cavity, in particular a cavity of a vehicle, including a carrier element and an expandable element supported by the carrier element, the expandable element including an expandable material, incorporating a plurality of gas bubbles forming a microcellular structure. Further presented is the process of manufacturing such a baffle or reinforcement element and its use.

14 Claims, 2 Drawing Sheets

(51) Int. Cl.
    *B29C 44/34*     (2006.01)
    *B60J 10/16*     (2016.01)
    *B29K 105/04*     (2006.01)
    *B29L 31/26*     (2006.01)

(52) U.S. Cl.
    CPC ........... *B60J 10/16* (2016.02); *B29K 2105/04* (2013.01); *B29L 2031/26* (2013.01)

(56) References Cited

U.S. PATENT DOCUMENTS

| | | | |
|---|---|---|---|
| 6,387,470 | B1 | 5/2002 | Chang et al. |
| 2004/0221953 | A1 | 11/2004 | Czaplicki et al. |
| 2006/0021697 | A1 | 2/2006 | Riley et al. |
| 2006/0135635 | A1* | 6/2006 | deVry .................. C08J 9/06 521/142 |
| 2013/0101826 | A1 | 4/2013 | Haug et al. |

FOREIGN PATENT DOCUMENTS

| | | |
|---|---|---|
| EP | 1995035 A2 | 11/2008 |
| JP | 2003-094475 A | 4/2003 |
| JP | 2003-306173 A | 10/2003 |
| JP | 2005-153715 A | 6/2005 |
| JP | 2010-059223 A | 3/2010 |
| JP | 2010-539304 A | 12/2010 |
| JP | 2012-210722 A | 11/2012 |
| JP | 2012-228987 A | 11/2012 |
| WO | 2005/080524 A1 | 9/2005 |
| WO | 2008/014053 A2 | 1/2008 |
| WO | 2008/065049 A1 | 6/2008 |
| WO | 2009/036784 A1 | 3/2009 |
| WO | 2011/012997 A2 | 2/2011 |
| WO | 2012/033979 A1 | 3/2012 |

OTHER PUBLICATIONS

Apr. 21, 2015 International Search Report issued in International Patent Application No. PCT/EP2014/077529.
Apr. 21, 2015 Written Opinion issued in International Patent Application No. PCT/EP2014/077529.
Aug. 20, 2018 Office Action issued in Chinese Patent Application No. 201480067909.7.
Nov. 9, 2017 Office Action issued in European Patent Application No. 14815641.7.
Jun. 9, 2017 Office Action issued in European Patent Application No. 14815641.7.
Jan. 17, 2019 Office Action issued in Chinese Patent Application No. 201480067909.7.
Sep. 18, 2018 Office Action issued in Japanese Patent Application No. 2016-539049.
Nov. 7, 2018 Office Action issued in European Patent Application No. 14 815 641.7.
Jul. 29, 2019 Office Action issued in Japanese Patent Application No. 2016-539049.
Jul. 5, 2019 Office Action issued in Chinese Patent Application No. 201480067909.7.

* cited by examiner

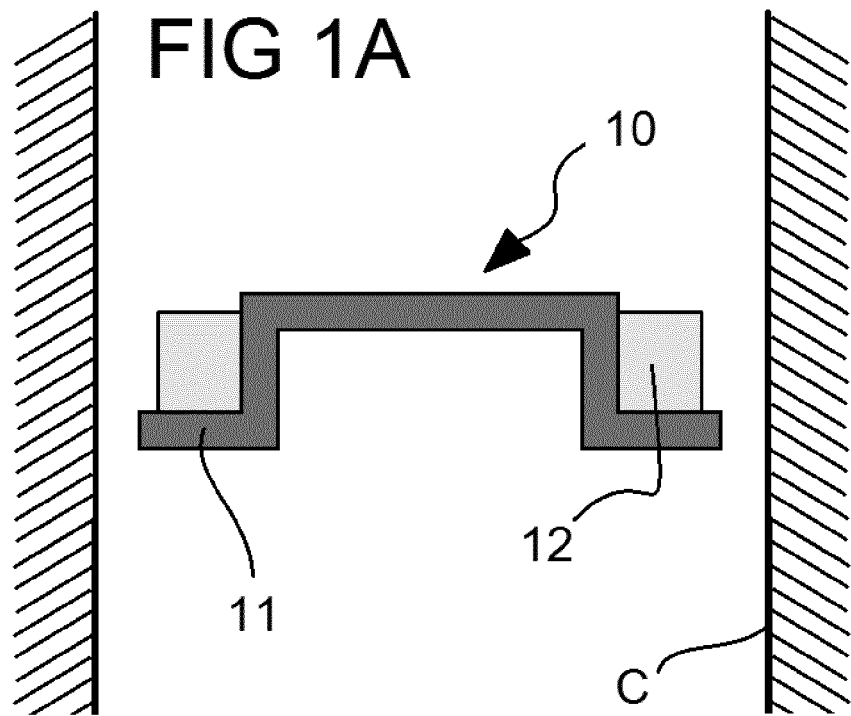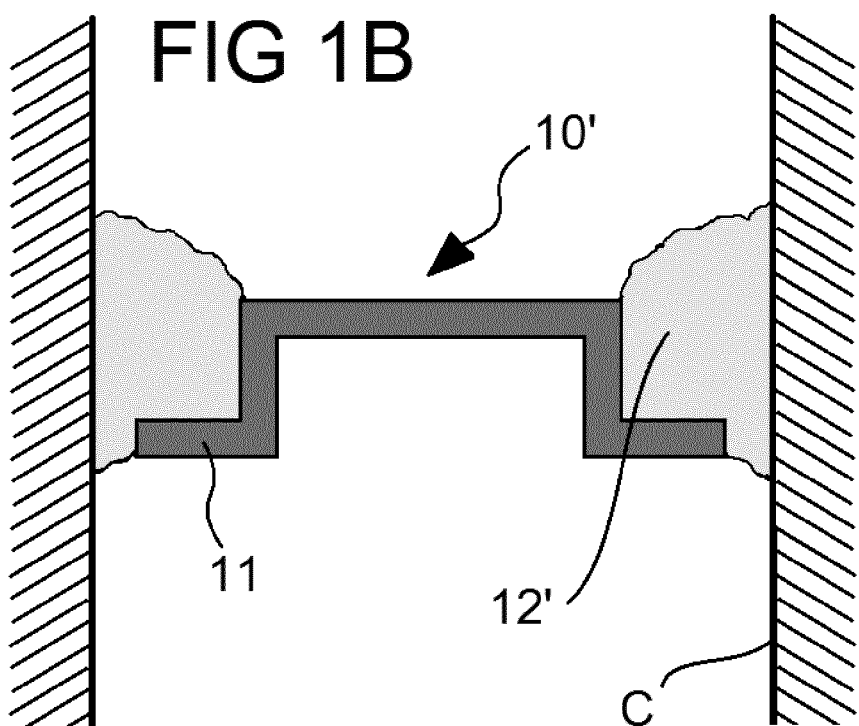

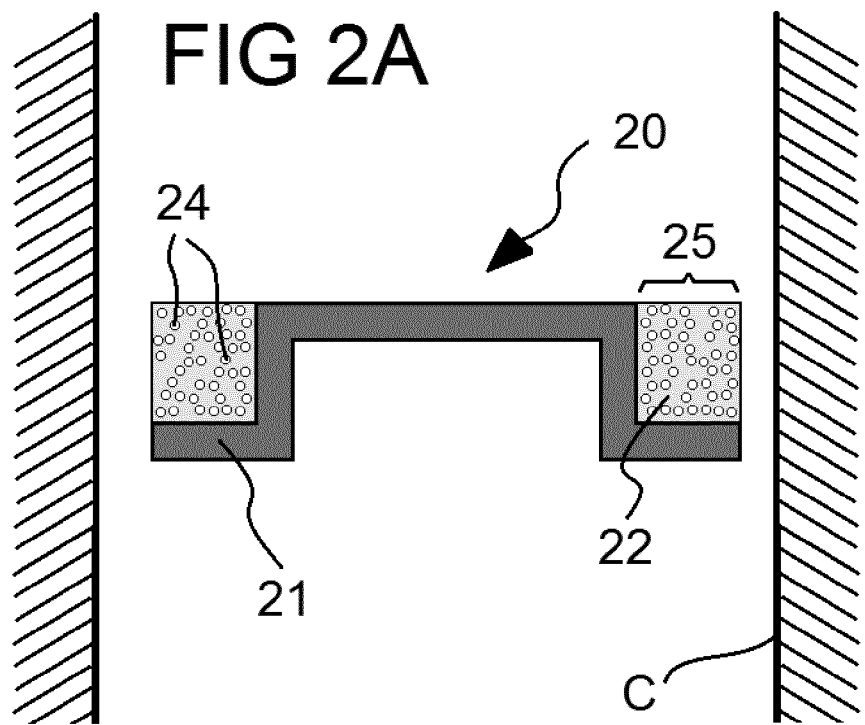
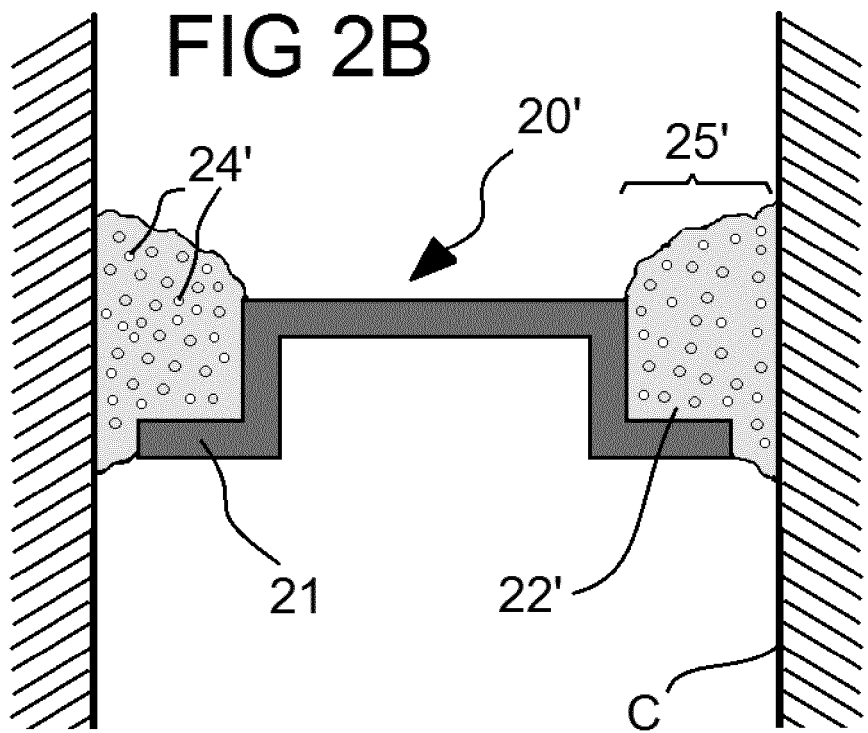

LIGHTWEIGHT BAFFLE OR REINFORCEMENT ELEMENT AND METHOD FOR PRODUCING SUCH A LIGHTWEIGHT BAFFLE OR REINFORCEMENT ELEMENT

TECHNICAL FIELD

The present invention relates to a lightweight baffle or reinforcement element for sealing, baffling and/or reinforcing a cavity, such as a cavity of an automotive vehicle, the process of manufacturing such an element and its use.

TECHNICAL BACKGROUND

Manufactured products often contain orifices and cavities or other hollow parts that result from the manufacturing process and/or that are designed into the product for various purposes, such as weight reduction. Automotive vehicles, for example, include several such orifices and cavities throughout the vehicle, including in the vehicle's structural pillars and in the sheet metal of the vehicle doors. It is often desirable to seal such orifices and cavities so as to minimise noise, vibrations, fumes, dirt, water and the like from passing from one area to another within the vehicle by means of sealing members or baffle elements built into the orifice or cavity. Likewise, such members or elements often fulfill an additional task of reinforcing the hollow structure of the manufactured product, e.g. automotive part, so much that it becomes more resistant to mechanical stress but still maintains the low weight advantage of the hollow structure.

Such elements used for sealing, baffling or reinforcing often consist of a carrier, made of plastic, metal, or another rigid material, and one or more layers of a thermoplastic material attached to it which is able to expand its volume when heat or another physical or chemical form of energy is applied. With such a design, it is possible to insert the baffle or reinforcement element into the hollow part of the structure during the manufacture process but also to leave the inner walls of the structure still accessible (or the cavities passable) by e.g. a liquid. For example, during the manufacture process of a vehicle, the hollow parts of a metal frame can still be largely covered by an electrocoating liquid while the baffle or reinforcement elements are already inserted, and afterwards during a heat treatment step, the expandable thermoplastic material layers of the baffle or reinforcement expand to close the cavities as intended.

The development of such baffles or reinforcement elements has led to highly advanced systems, where the expandable material is able to increase its volume by up to 2000% or more, forming a foam-like structure filling the cavities and adhering to the walls of the structure intended to be sealed, baffled, or reinforced. Especially in automotive manufacturing, this has led to considerable weight reduction and excellent dampening of noise or vibrations in the car body.

With advanced materials that are able to expand even more, it is possible to reduce initial material mass and therefore contribute further to weight reduction and cost efficiency.

However, increasingly small portions of expandable material can also cause problems in manufacturing of the baffle or reinforcement elements. As such elements (or at least the expandable material layers) are normally produced by injection molding or extrusion, the feeding of very small sections gives rise to higher processing demands, such as higher injection pressures, or causes quality issues, such as flashing, short shots (incompletely molded parts) or material degradation.

It is thus desirable to obtain a way of manufacturing baffle or reinforcement elements with less initial mass of expandable material, but without the problems connected to very small initial volumes of that material.

SUMMARY OF THE INVENTION

It is an object of the present invention to provide a baffle and/or reinforcement element with reduced weight and reduced material costs, yet without the disadvantages that normally arise from material-saving, small-scale manufacturing. Furthermore, the present invention shall propose ways to produce such baffle and/or reinforcement elements.

The present invention provides a solution to that problem by reducing the density of the expandable material by means of incorporating micro-cellular gas bubbles during the manufacture process, thereby significantly reducing the weight at constant volume but maintaining good processability, without the need of reducing the volume or changing the geometry of said expandable material layers.

The present invention achieves this with the features of independent claim 1 by providing a baffle and/or reinforcement element that comprises one or more layers of expandable material containing a plurality of microscopic gas bubbles. The dependent claims present embodiments of products according to the present invention or processes to obtain a product according to the present invention, or uses of such a product.

The principle of any embodiment of the present invention is a substitution of a part of the expandable thermoplastic material of a baffle and/or reinforcement element by gas, such that the gas is finely and largely uniformly dispersed within the material in the form of microscopic bubbles. Such microscopic bubbles typically have sizes in the range of between about a micrometre and several millimetres, preferably between 1 and 100 micrometres, and they may have a large size distribution or have essentially uniform size, all depending on the surrounding thermoplastic matrix and by which method they were produced. Compared to a baffle and/or reinforcement element without incorporation of a gas according to the invention disclosed herein, the embodiments of the present invention substitute more than 1%, preferably more than 10%, more preferably more than 25%, most preferably more than 40% of the volume of the expandable material by gas. Of course, this substitution leads to a proportional decrease in total mass (weight) of the material layer with increasing substitution of the thermoplastic material by gas. The effect of this is mainly that an amount of thermoplastic material can be saved which corresponds directly to the amount of gas used, or, accordingly, a larger material layer can be produced with the same amount of material, thus facing less problems connected to small-scale molding or extrusion, such as process or quality problems.

In the most preferred embodiment, the expandable material layer of the baffle and/or reinforcement element is manufactured by molding or extruding a thermoplastic, heat-expandable material into its desired shape and simultaneously feeding a gas, preferably nitrogen or carbon dioxide in its supercritical state into the thermoplastic melt while or before the thermoplastic material is introduced into the mold. Under sufficiently high temperature and sufficiently high pressure, the gas (or supercritical fluid) and the thermoplastic material form an essentially single-phasic, largely homogeneous mixture. When temperature and/or pressure drop, a plurality of finely dispersed, microscopic bubbles form as the supercritical fluid gasses out, thus creating a micro-cellular structure in the expandable material layer. A suitable process for this is commercialised e.g. under the trade name MuCell® by the company Trexel Inc., USA.

In another embodiment, the microscopic gas bubbles are introduced into the expandable material layer by mixing the thermoplastic material with so-called "expandable microspheres". These are microscopic, essentially spherical bodies comprising a thermoplastic shell encapsulating, e.g., a low-boiling point liquid hydrocarbon. Under elevated temperature conditions such microspheres expand, growing from approximately 5 micrometers to up to approximately 90 micrometres in diameter, by softening the thermoplastic shell and increasing the liquid hydrocarbon content's pressure as it becomes gaseous under influence of heat. Such microspheres are sold, e.g., under the trade name Expancel® by AkzoNobel N.V., the Netherlands. In order to achieve a sufficiently high incorporation of gas bubbles as to accord with the present invention, at least 5 wt % of the material comprising the expandable material layer have to consist of such microspheres, preferably at least 10 wt %, more preferably at least 15 wt %, even more preferably at least 25 wt %, especially preferably at least 30 wt %, most preferably at least 40 wt %.

In a further embodiment, the microcellular structure of the expandable material layer on the baffle and/or reinforcement element is realised by mixing a second blowing agent into the thermoplastic material prior to the molding or extrusion of the expandable material layer. Examples of such second blowing agents include chemical blowing agents, such as azodicarbonamides, sulfohydrazides, carbonates, or physical blowing agents. The second blowing agent useful for the present invention should exhibit a decomposing reactivity (including formation of gaseous products) or gas release activity starting at the transformation temperature of the expandable material so that gas release takes place inside the expandable material shortly before or during the molding or extrusion process. Preferably, the second blowing agent decomposes or releases gas between 50° C. and 150° C., more preferably between 50° C. and 110° C., even more preferably between 50° C. and 90° C. It is however crucial that the conditions leading to gas release of such a second blowing agent differ sufficiently from the conditions leading to expansion of the expandable material on the baffle and/or reinforcement element. If both processes are triggered by heat, the threshold of the process forming the bubbles should be significantly lower than the one for the expansion, preferably at least 20° C. lower, more preferably at least 30° C. lower, most preferably at least 40° C. lower.

The pronounced microcellular structure of the expandable material layer of a baffle and/or reinforcement element according to the present invention favours its use as a baffle or sealing element, such as for noise or vibration reduction, thermal insulation, or the like. However, any geometry of the carrier part is possible, and with a suitable design including ribs, transversal walls, and such, and a rigid material for the carrier, also strong reinforcement elements are obtainable with embodiments of the present invention.

BRIEF DESCRIPTION OF THE DRAWINGS

The drawings shall provide a simple view on the object of the present invention by presenting one of its possible embodiments (FIGS. 2A and 2B). For a better understanding and for comparison, an example not according to the present invention is also shown (FIGS. 1A and 1B). Only those features are labelled that are significant for the concept of the present invention.

FIG. 1A a cross-sectional view on a conventional baffle or reinforcement element, introduced into a cavity, prior to expansion of its expandable material layers;

FIG. 1B a cross-sectional view on a conventional baffle or reinforcement element, introduced into a cavity, after expansion of its expandable material layers;

FIG. 2A a cross-sectional view on an embodiment of a baffle and/or reinforcement element according to the present invention, introduced into a cavity, prior to expansion of its expandable material layers;

FIG. 2B a cross-sectional view on an embodiment of a baffle and/or reinforcement element according to the present invention, introduced into a cavity, after expansion of its expandable material layers.

DETAILED DESCRIPTION OF INVENTION

The terms "expandable material layer" and "expandable element" are used interchangeably throughout this document. The unit term "wt %" means percentage by weight. The terms "mass" and "weight" are used interchangeably in this document.

The present invention aims at an improved process (and the products thereof) for manufacturing baffle and/or reinforcement elements that are able to fill a cavity or hollow structural part of a manufactured or constructed object by 1) being inserted in said cavity and 2) by partially expanding due to a triggered (e.g., by heat) chemical or physical process, thus fully or partially filling the cavity and adhering to one or more of its walls. Although it is contemplated that the baffle and/or reinforcement element may be employed in a variety of articles of manufacture or construction, for exemplary purposes, the baffle and/or reinforcement element is mainly discussed herein as being employed in an automotive vehicle.

FIGS. 2A and 2B show a cross-sectional view on a baffle or reinforcement element in accordance with the present invention. More specifically, depicted in FIG. 2A is a schematic view on such a baffle or reinforcement element 20 in its native, unexpanded state, while in FIG. 2B the same element 20' in its expanded state is presented. FIG. 2B shows how the expanded material layers 25' adhere to the walls of a cavity C, such as a cavity in a hollow structural part of an automobile. Such hollow parts in cars may include body components (e.g., panels), frame components (e.g., hydroformed tubes), pillar structures (e.g., A, B, C, or D-pillars), bumpers, roofs, or the like.

Baffles and/or reinforcement elements 20 according to the present invention comprise a carrier element 21, which may exhibit any form and geometry suitable for the intended task, and at least one layer 25 of an expandable material 22 that contains, due to its specific way of manufacture, a plurality of gas bubbles 24.

For comparison and better understanding, a conventional baffle or reinforcement element (not according to the present invention) is shown in FIG. 1A and FIG. 1B, showing its basic features including a carrier element 11, and layers of expandable material 12. While FIG. 1A shows the baffle or reinforcement element 10 before expansion of the expandable material 12, FIG. 1B shows the baffle or reinforcement element 10' after expansion, including the expanded material layers 12', now adhering to the walls of the cavity C. The schematically drawn layer of expandable material 12 is smaller in volume than the corresponding layer 25 of the present invention, shown in FIG. 2A, although the same amount of expandable material is thought of having been used in both comparative examples. This is representing the fact that by incorporation of the gas bubbles 24 in the baffle and/or reinforcement element 20, larger volumes (and easier manufacturing of small parts) can be achieved by applying the teachings of the present invention.

The carrier element 21 may consist of any material that can be processed into a shape useable for an embodiment of the present invention. Preferred materials are polymeric materials, such as a plastic, an elastomer, a thermoplastic, a thermosettable polymer, a blend or other combination thereof or the like.

Preferred thermoplastic materials include, without limitation, polymers such as polyurethanes, polyamides, polyesters, polyolefins, polysulfones, poly(ethylene terephthalates), polyvinylchlorides, chlorinated polyolefins, or the like. Further preferred are high-temperature stable polymers such as poly(phenyl ethers), polysulfones, or polyethersulfones. Other suitable materials include metals, especially aluminium or steel, or naturally grown, organic materials, such as wood or other (pressed) fibrous materials. Also glassy or ceramic materials can be used. It is possible to use any combination of such materials. It is also contemplated that such materials can be filled (e.g. with fibres, minerals, clays, silicates, carbonates, combinations thereof or the like). It is also contemplated that such carrier materials can be foamed, as disclosed in WO2004043668, which is hereby incorporated by reference. Especially preferred materials for the carrier 21 used in a baffle and/or reinforcement element 20 according to the present invention are polyamides, preferably polyamide 6, polyamide 6,6, polyamide 11, polyamide 12, or a mixture thereof.

The carrier element 21 can further exhibit any shape or geometry. It can also consist of several, not directly connected parts. For example, it can be massive, hollow, or foamed, or it can exhibit a grid-like structure. The surface of the carrier element can typically be smooth, rough, or structured, according to the intended use of the baffle and/or reinforcement element 20.

The manufacturing process of a baffle and/or reinforcement element in accordance with the present invention 20 depends largely on the material of the carrier 21. If the material of the carrier can be (injection-) molded or extruded, the whole baffle and/or reinforcement element 20 can be produced in a two-step injection-molding process or a co-extrusion process of the carrier 21 and the expandable material layer 25. If using a two-step injection molding process, in a first step, material for the the carrier element 21 is injected into the mold. After solidification, the cavity of the injection molding tool is enlarged or adjusted, or the injection-molded piece is transferred into another tool, and the second component, in this case the material 22 for the expandable layer 25 is injected.

If the carrier 21 is not shaped by injection-molding or extrusion, e.g., because it consist of a metal or alloy, it is first manufactured by a suitable process and then introduced into the injection-molding tool, and the expandable material layer 25 is injection-molded into the tool where the carrier element 21 was placed. Another possibility is to extrude the expandable material layer 25 onto the pre-fabricated carrier 21. Of course there is also the possibility of manufacturing the carrier 21 and the expandable material layer 25 individually by a suitable process, and then attaching the expandable material layer 25 to the carrier 21 by any suitable means, such as chemically or physically, e.g. by gluing or the like, or mechanically, e.g. by bolting, screwing, or the like.

The expandable material layer 25 consists of an expandable material 22 and a plurality of gas bubbles 24. Suitable as expandable material 22 is basically any material that can be foamed under controlled conditions. Typically, the material foaming can be triggered by heat, humidity, or electromagnetic radiation, while temperature-controlled expansion (foaming) is preferred.

Such an expandable material 22 contains typically a chemical or physical blowing agent. Chemical blowing agents are organic or inorganic compounds that decompose under influence of temperature, humidity, or electromagnetic radiation, while at least one of the formed decomposition products is a gas. Physical blowing agents include, but are not limited to, compounds that become gaseous at a certain temperature. Thus, both chemical and physical blowing agents are suitable to cause an expansion in the expandable material 22 of the expandable material layer 25.

Preferably, the expandable material 22 is foamed thermally, while chemical blowing agents are used. Suitable chemical blowing agents are, e.g., azodicarbonamide, dinitrosopentamethylenetetramine, 4,4'-oxy-bis(benzenesulphonylhydrazide), trihydrazinotriazine, and N,N'-dimethyl-N,N'-dinitrosoterephthalamide, and combinations thereof and the like. The heat required for the decomposition reaction that causes the foaming (expansion) can be applied externally or internally, the latter e.g. from an exothermic reaction. Preferably, the exbaldable material 22 foams at a temperature of less than 160° C., especially between 80° C. to 150° C., more preferably between 90° C. and 140° C.

If the baffle and/or reinforcement element 20 is used in automotive manufacturing, it is preferable that the expansion activation temperature of the expandable material 22 is adjusted to the manufacturing conditions of the automotive part to be baffled or reinforced. As an example, the baffle and/or reinforcement element 20 can be inserted into a cavity of a structure that needs to be treated by an electrocoating liquid, in its unexpanded state 20 still leaving the surface of the structure accessible, and subsequently, during the heat treatment of the automotive part, the baffle and/or reinforcement element 20 simultaneously expands to its intended final shape 20'. In such a case, the expansion temperature should correspond to the temperature conditions of said heat treatment, i.e. to between 90° C. and 200° C.

Suitable composition materials for the expandable material 22 include, e.g., one-component epoxy resins that are substantially solid at room temperature (approximately 20° C.) and which exhibit high impact strength and contain thixotropy additives such as silica or nanoclays. As an example, such epoxy systems normally contain 20 to 50 wt % of a liquid epoxy resin, 0 to 30 wt % of a solid epoxy resin, 5 to 30 wt % toughening additives, 1 to 5 wt % physical or chemical blowing agents, 10 to 40 wt % fillers, 1 to 10 wt % thixotropy additives, and 2 to 10 wt % heat-activated hardeners. Suitable as tougheners are, e.g., reactive liquid rubbers based on nitrile rubber or derivatives of polyetherpolyol-polyurethanes, core-shell-polymers, and other such systems known to the person skilled in the art.

Further suitable materials that can be incorporated in the expandable material 22 together with a blowing agent include one-component polyurethane compositions comprising crystalline, OH-functional polyesters and other polyols, preferably polyetherpolyols, and polyisocyanates with blocked isocyanate groups. The melting point of the crystalline polyester should exceed about 50° C. Isocyanate groups can be blocked, e.g, by nucleophiles such as caprolactam, phenols, or benzoxalones. Furthermore suitable are blocked polyisocyanates as for example used in powder coating which are commercially available, e.g., under the trade name Vestagon® BF 1350 and Vestagon® BF 1540 by Degussa GmbH, Germany. Other suitable polyisocyanates include so-called encapsulated or surface-deactivated polyisocyanates which are known to the person skilled in the art and which are described, e.g. in EP 0 204 970.

Furthermore suitable for the expandable material 22 are two-component epoxy/polyurethane compositions containing blowing agents, as for example disclosed in WO2005080524, which is hereby incorporated by reference.

Further suitable materials for the expandable material 22 include, but are not limited to, ethylene-vinyl-acetate polymer systems, polyolefin materials, copolymers and terpolymers with at least one monomer an alpha-olefin, phenol/formaldehyde resins, or the like containing a blowing agent.

Especially suitable expandable materials are e.g. commercially available under the trade name SikaBaffle® 240, SikaBaffle® 250, or SikaBaffle® 255, sold by Sika Corp., USA, as described in the U.S. Pat. Nos. 5,266,133 and 5,373,027, all of which are hereby incorporated by reference. Such materials are especially preferred for the manufacturing of the baffle and/or reinforcement elements 20 according to the present invention.

If the present invention is used aiming at products with high reinforcement abilities, especially preferred materials for example include materials such as sold under the trade name SikaReinforcer® 941, by Sika Corp., USA. Such materials are disclosed in U.S. Pat. No. 6,387,470, which is hereby incorporated by reference.

The gas bubbles 24 are incorporated into the material 22 before or during the manufacturing of the expandable material layer 25. In a preferred embodiment, the expandable material layer of the baffle and/or reinforcement element 20 is manufactured by molding or extruding a thermoplastic, heat-expandable material into its desired shape and more or less simultaneously feeding a gas, preferably nitrogen or carbon dioxide, in its supercritical state into the thermoplastic melt while or before the thermoplastic material is introduced into the mold. Under sufficiently high temperature and sufficiently high pressure, the gas (or supercritical fluid) and the thermoplastic material form an essentially single-phasic, largely homogeneous mixture. When temperature and/or pressure drop, a plurality of finely dispersed, microscopic bubbles form as the supercritical fluid gasses out, thus creating a micro-cellular structure in the expandable material layer. A suitable process for this is commercialised e.g. under the trade name MuCell® by the company Trexel Inc., USA.

It is also possible to introduce the microscopic gas bubbles 24 into the expandable material 22 by mixing the thermoplastic material with so-called "expandable microspheres". These are microscopic, essentially spherical bodies comprising a thermoplastic shell encapsulating, e.g., a low-boiling point liquid hydrocarbon. Under elevated temperature conditions such microspheres expand, growing from approximately 5 micrometers to up to approximately 90 micrometres in diameter, by softening the thermoplastic shell and increasing the liquid hydrocarbon content's pressure as it becomes gaseous under influence of heat, such as, e.g., during the manufacturing process of the expandable material layer 25. Such microspheres are sold, e.g., under the trade name Expancel® by AkzoNobel N.V., the Netherlands. In order to achieve a sufficiently high incorporation of gas bubbles as to accord with the present invention, at least 5 wt % of the material comprising the expandable material layer have to consist of such microspheres, preferably at least 10 wt %, more preferably at least 15 wt %, even more preferably at least 25 wt %, especially preferably at least 30 wt %, most preferably at least 40 wt %.

Furthermore, the microcellular structure of the expandable material layer 25 on the baffle and/or reinforcement element 20 can be realised by mixing a second blowing agent into the expandable material 22 prior to the molding or extrusion of the expandable material layer 25. Examples of such second blowing agents include chemical blowing agents, such as azodicarbonamides, sulfohydrazides, carbonates, or physical blowing agents. The second blowing agent useful for the present invention should exhibit a decomposing reactivity (including formation of gaseous products) or gas release activity starting at the transformation temperature of the expandable material 22 so that gas release takes place inside the expandable material 22 shortly before or during the molding or extrusion process. Preferably, the second blowing agent decomposes or releases gas between 50° C. and 150° C., more preferably between 50° C. and 110° C., even more preferably between 50° C. and 90° C. It is however crucial that the conditions leading to gas release of such a second blowing agent differ sufficiently from the conditions leading to expansion of the expandable material 22 on the baffle and/or reinforcement element 20. If both processes are triggered by heat, the threshold of the process forming the bubbles should be significantly lower than the one for the expansion, preferably at least 20° C. lower, more preferably at least 30° C. lower, most preferably at least 40° C. lower.

Any substance that is gaseous under ambient conditions, i.e. approximately 1 bar pressure and a temperature of approximately 20° C., can be used as a gas to form the microcellular structure by gas bubbles 24 in the expandable material layer 25 of a baffle and/or reinforcement element 20 according to the present invention. Preferably used gases are relatively inexpensive and/or non-reactive, in order to avoid undesired chemical side-reactions, and/or easily transformed into a supercritical fluid. Examples of such preferred gases include (but are not limited to) air, nitrogen, carbon dioxide, gaseous hydrocarbons, noble gases, or mixtures thereof. Especially preferred are nitrogen and/or carbon dioxide and/or gaseous hydrocarbons, examples of which include propane, propene, butane, butene, isobutane, isobutene, or mixtures thereof.

Of course the present invention is not limited to the examples described herein, especially not to the drawings, which only illustrate the general principle of the present invention, or one simple embodiment. A person of ordinary skill in the art would realise, however, that certain modifications would come within the teachings of the present invention. Therefore, the following claims should be studied to determine the true scope and content of the invention.

REFERENCE SIGNS

10; 20 Baffle and/or reinforcement element
10'; 20' Expanded baffle and/or reinforcement element
11; 21 Carrier element
12; 22 Expandable material
12'; 22' Expanded material
24 Incorporated gas bubbles in expandable material 24' Incorporated gas bubbles in expanded material
25 Expandable material layer or expandable element
25' Expanded material layer or expanded element
C Cavity or hollow structure

The invention claimed is:

1. An element for sealing, baffling and/or reinforcing a cavity in a structure of manufacture, comprising:
   at least one carrier element,
   at least one expandable element, supported by the carrier element, the expandable element comprising:
   a material expandable by heat, humidity, and/or radiation, and
   a plurality of microscopic gas bubbles incorporated into the expandable material such that more than 10% of the volume of the expandable material is substituted by gas,
   wherein
      the expandable material comprises a chemical blowing agent that causes an expansion of the expandable material, and
      the microscopic gas bubbles have a diameter of between 1 and 100 micrometers.

2. The element of claim 1, wherein the expandable element weighs at least 1% less than the same element without the microscopic gas bubbles.

3. The element of claim 1, wherein the expandable element weighs at least 10% less than the same element without the microscopic gas bubbles.

4. The element of claim 1, wherein the expandable element weighs at least 25% less than the same element without the microscopic gas bubbles.

5. The element of claim 1, wherein the expandable element weighs at least 40% less than the same element without the microscopic gas bubbles.

6. The element of claim 1, wherein the microscopic gas bubbles comprise air, nitrogen, carbon dioxide, a gaseous hydrocarbon, a noble gas, or a mixture thereof.

7. The element of claim 1, wherein the microscopic gas bubbles comprise a thermoplastic shell filled with air, nitrogen, carbon dioxide, a gaseous hydrocarbon, a noble gas, or a mixture thereof.

8. The element of claim 1, wherein the expandable material contains a second blowing agent that causes the formation of the microscopic gas bubbles during the manufacturing process of the element.

9. A process for manufacturing an expandable element to be incorporated into an element as described in claim 1, comprising:
   molding and/or extruding an expandable material to form an expandable element wherein the molding and/or extrusion process includes applying a sufficiently high temperature and sufficiently high pressure to the material for maintaining a gas, liquid or supercritical fluid within the material while the gas, liquid or supercritical fluid is being fed into the material during the molding and/or extrusion process in order to produce a plurality of microscopic gas bubbles in the expandable element.

10. The process of claim 9, wherein the expandable material comprises at least one thermoplastic polymer including an epoxy resin, ethylene vinyl acetate, a polyurethane, a polyolefin, or a derivate or a mixture thereof.

11. A process for manufacturing an expandable element to be incorporated into an element as described in claim 1, comprising:
   molding and/or extruding an expandable material to form an expandable element wherein the expandable material contains essentially spherical bodies consisting of a thermoplastic shell filled with an expandable gas, liquid or supercritical fluid that expands during the molding and/or extrusion process by a sufficiently high temperature provided to form a plurality of microscopic gas bubbles in the expandable element.

12. A process for manufacturing an expandable element to be incorporated into an element as described in claim 1, comprising:
   molding and/or extruding an expandable material to form an expandable element wherein the expandable material contains a second blowing agent that forms a plurality of microscopic gas bubbles within the expandable element by decomposing into a gas and a residue during the molding and/or extrusion process.

13. A method comprising: sealing, baffling, or reinforcing a cavity or hollow structure of a land-, water-, or air-vehicle, and/or a cavity of a building with the element of claim 1 such that the transmission of noise, vibrations, and/or heat is reduced, and/or the object surrounding the cavity is mechanically strengthened.

14. A method for baffling and/or reinforcing a cavity or hollow structure, wherein the element of claim 1 is introduced into the cavity or hollow structure and subsequently the expandable element is expanded to form the expanded element.

* * * * *

UNITED STATES PATENT AND TRADEMARK OFFICE
CERTIFICATE OF CORRECTION

| | | |
|---|---|---|
| PATENT NO. | : 10,549,792 B2 | Page 1 of 1 |
| APPLICATION NO. | : 15/101284 | |
| DATED | : February 4, 2020 | |
| INVENTOR(S) | : Belpaire | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 340 days.

Signed and Sealed this
Twenty-fourth Day of November, 2020

Andrei Iancu
*Director of the United States Patent and Trademark Office*